United States Patent
Li et al.

(10) Patent No.: US 11,972,690 B2
(45) Date of Patent: Apr. 30, 2024

(54) PLATOONING METHOD, APPARATUS AND SYSTEM OF AUTONOMOUS DRIVING PLATOON

(71) Applicant: Beijing Tusen Zhitu Technology Co., Ltd., Beijing (CN)

(72) Inventors: Wenrui Li, Beijing (CN); Nan Wu, Beijing (CN); Rui Peng, Beijing (CN); Qingxin Bi, Beijing (CN); Yuhe Jin, Beijing (CN); Yiming Li, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 429 days.

(21) Appl. No.: 17/347,099

(22) Filed: Jun. 14, 2021

(65) Prior Publication Data

US 2021/0358308 A1    Nov. 18, 2021

Related U.S. Application Data

(63) Continuation of application No. PCT/CN2019/077076, filed on Mar. 6, 2019.

(30) Foreign Application Priority Data

Dec. 14, 2018 (CN) .......................... 201811530975.X

(51) Int. Cl.
*B60K 35/00* (2006.01)
*B60W 30/165* (2020.01)
(Continued)

(52) U.S. Cl.
CPC ............... *G08G 1/22* (2013.01); *B60K 35/00* (2013.01); *B60W 30/165* (2013.01);
(Continued)

(58) Field of Classification Search
CPC . G08G 1/22; G08G 1/20; B60K 35/00; B60K 2370/166; B60W 50/14;
(Continued)

(56) References Cited

U.S. PATENT DOCUMENTS 6,084,870 A    7/2000  Wooten et al.
6,263,088 B1   7/2001  Crabtree
(Continued)

FOREIGN PATENT DOCUMENTS

CN    103604436 A       2/2014
CN    105809950 A   *   7/2016
(Continued)

OTHER PUBLICATIONS

Carle, Patrick J.F. et al. "Global Rover Localization by Matching Lidar and Orbital 3D Maps." IEEE, Anchorage Convention District, pp. 1-6, May 3-8, 2010. (Anchorage Alaska, US).
(Continued)

*Primary Examiner* — Adam R Mott
*Assistant Examiner* — Heather J Keniry
(74) *Attorney, Agent, or Firm* — Perkins Coie LLP

(57) ABSTRACT

The present disclosure provides a method and a server for platooning. The method provides: obtaining, based on a platooning request message, a first vehicle type and first kinematic information of a vehicle to join a platoon, a second vehicle type and second kinematic information of a current tail of the platoon, first sensor operating status information of the vehicle to join the platoon, and second sensor operating status information of the current tail vehicle; performing vehicle kinematic determination to obtain a kinematic determination result; performing sensor determination to obtain a sensor determination result; transmitting a confirmation request message to a vehicle of the platoon when the determination results are both successful;
(Continued)

and controlling, upon receiving a request approval message, the vehicle to join the platoon to establish a V2V communication connection with each vehicle in the platoon. The method can achieve platoon without any road side unit.

20 Claims, 5 Drawing Sheets

(51) Int. Cl.
*B60W 50/00* (2006.01)
*B60W 50/14* (2020.01)
*B60W 60/00* (2020.01)
*G05D 1/02* (2020.01)
*G07C 5/08* (2006.01)
*G08G 1/00* (2006.01)
*H04W 4/46* (2018.01)
*H04W 76/10* (2018.01)

(52) U.S. Cl.
CPC ............ *B60W 50/00* (2013.01); *B60W 50/14* (2013.01); *B60W 60/0025* (2020.02); *G07C 5/085* (2013.01); *G08G 1/20* (2013.01); *H04W 4/46* (2018.02); *H04W 76/10* (2018.02); *B60K 2370/166* (2019.05); *B60W 2050/146* (2013.01); *B60W 2554/4041* (2020.02); *B60W 2554/802* (2020.02); *B60W 2556/45* (2020.02)

(58) Field of Classification Search
CPC ... B60W 2050/146; B60W 2554/4041; B60W 2556/45; B60W 30/165; B60W 50/00; B60W 60/0025; B60W 2554/802; B60W 2050/0043; G07C 5/085; H04W 4/46; H04W 76/10; G05D 1/0293; G05D 2201/0213
See application file for complete search history.

(56) References Cited

U.S. PATENT DOCUMENTS

| | | |
|---|---|---|
| 6,594,821 B1 | 7/2003 | Banning et al. |
| 6,777,904 B1 | 8/2004 | Degner |
| 6,975,923 B2 | 12/2005 | Spriggs |
| 7,103,460 B1 | 9/2006 | Breed |
| 7,689,559 B2 | 3/2010 | Canright |
| 7,742,841 B2 | 6/2010 | Sakai et al. |
| 7,783,403 B2 | 8/2010 | Breed |
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,164,628 B2 | 4/2012 | Stein |
| 8,175,376 B2 | 5/2012 | Marchesotti |
| 8,271,871 B2 | 9/2012 | Marchesotti |
| 8,346,480 B2 | 1/2013 | Trepagnier et al. |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagnier |
| 8,478,072 B2 | 7/2013 | Aisaka |
| 8,532,870 B2 | 9/2013 | Hoetzer et al. |
| 8,553,088 B2 | 10/2013 | Stein |
| 8,706,394 B2 | 4/2014 | Trepagnier et al. |
| 8,718,861 B1 | 5/2014 | Montemerlo et al. |
| 8,788,134 B1 | 7/2014 | Litkouhi |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson |
| 8,981,966 B2 | 3/2015 | Stein |
| 8,983,708 B2 | 3/2015 | Choe et al. |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi |
| 9,042,648 B2 | 5/2015 | Wang |
| 9,081,385 B1 | 7/2015 | Ferguson et al. |
| 9,088,744 B2 | 7/2015 | Grauer et al. |
| 9,111,444 B2 | 8/2015 | Kaganovich |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,182,764 B1 | 11/2015 | Kolhouse et al. |
| 9,183,447 B1 | 11/2015 | Gdalyahu |
| 9,185,360 B2 | 11/2015 | Stein |
| 9,191,634 B2 | 11/2015 | Schofield |
| 9,214,084 B2 | 12/2015 | Grauer et al. |
| 9,219,873 B2 | 12/2015 | Grauer et al. |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,282,144 B2 | 3/2016 | Tebay et al. |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-guzman et al. |
| 9,317,776 B1 | 4/2016 | Honda |
| 9,330,334 B2 | 5/2016 | Lin |
| 9,342,074 B2 | 5/2016 | Dolgov |
| 9,347,779 B1 | 5/2016 | Lynch |
| 9,355,635 B2 | 5/2016 | Gao |
| 9,365,214 B2 | 6/2016 | Ben Shalom |
| 9,399,397 B2 | 7/2016 | Mizutani |
| 9,418,549 B2 | 8/2016 | Kang et al. |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,483,839 B1 | 11/2016 | Kwon |
| 9,490,064 B2 | 11/2016 | Hirosawa |
| 9,494,935 B2 | 11/2016 | Okumura et al. |
| 9,507,346 B1 | 11/2016 | Levinson et al. |
| 9,513,634 B2 | 12/2016 | Pack et al. |
| 9,531,966 B2 | 12/2016 | Stein |
| 9,535,423 B1 | 1/2017 | Debreczeni |
| 9,538,113 B2 | 1/2017 | Grauer et al. |
| 9,547,985 B2 | 1/2017 | Tuukkanen |
| 9,549,158 B2 | 1/2017 | Grauer et al. |
| 9,555,803 B2 | 1/2017 | Pawlicki |
| 9,568,915 B1 | 2/2017 | Berntorp |
| 9,587,952 B1 | 3/2017 | Slusar |
| 9,599,712 B2 | 3/2017 | Van Der Tempel et al. |
| 9,600,889 B2 | 3/2017 | Boisson et al. |
| 9,602,807 B2 | 3/2017 | Crane et al. |
| 9,612,123 B1 | 4/2017 | Levinson et al. |
| 9,620,010 B2 | 4/2017 | Grauer et al. |
| 9,625,569 B2 | 4/2017 | Lange |
| 9,628,565 B2 | 4/2017 | Stenneth et al. |
| 9,649,999 B1 | 5/2017 | Amireddy et al. |
| 9,652,860 B1 | 5/2017 | Maali |
| 9,669,827 B1 | 6/2017 | Ferguson et al. |
| 9,672,446 B1 | 6/2017 | Vallesi-Gonzalez |
| 9,690,290 B2 | 6/2017 | Prokhorov |
| 9,701,023 B2 | 7/2017 | Zhang et al. |
| 9,712,754 B2 | 7/2017 | Grauer et al. |

(56) References Cited

U.S. PATENT DOCUMENTS

| | | | |
|---|---|---|---|
| 9,720,418 B2 | 8/2017 | Stenneth |
| 9,723,097 B2 | 8/2017 | Harris |
| 9,723,099 B2 | 8/2017 | Chen |
| 9,723,233 B2 | 8/2017 | Grauer et al. |
| 9,726,754 B2 | 8/2017 | Massanell et al. |
| 9,729,860 B2 | 8/2017 | Cohen et al. |
| 9,738,280 B2 | 8/2017 | Rayes |
| 9,739,609 B1 | 8/2017 | Lewis |
| 9,746,550 B2 | 8/2017 | Nath |
| 9,753,128 B2 | 9/2017 | Schweizer et al. |
| 9,753,141 B2 | 9/2017 | Grauer et al. |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |
| 9,779,276 B2 | 10/2017 | Todeschini et al. |
| 9,785,149 B2 | 10/2017 | Wang et al. |
| 9,805,294 B2 | 10/2017 | Liu et al. |
| 9,810,785 B2 | 11/2017 | Grauer et al. |
| 9,823,339 B2 | 11/2017 | Cohen |
| 9,953,236 B1 | 4/2018 | Huang |
| 10,147,193 B2 | 12/2018 | Huang |
| 10,223,806 B1 | 3/2019 | Yi et al. |
| 10,223,807 B1 | 3/2019 | Yi et al. |
| 10,410,055 B2 | 9/2019 | Wang et al. |
| 2003/0114980 A1 | 6/2003 | Klausner et al. |
| 2003/0174773 A1 | 9/2003 | Comaniciu |
| 2004/0264763 A1 | 12/2004 | Mas et al. |
| 2007/0067077 A1 | 3/2007 | Liu et al. |
| 2007/0183661 A1 | 8/2007 | El-Maleh |
| 2007/0183662 A1 | 8/2007 | Wang |
| 2007/0230792 A1 | 10/2007 | Shashua |
| 2007/0286526 A1 | 12/2007 | Abousleman |
| 2008/0249667 A1 | 10/2008 | Horvitz |
| 2009/0040054 A1 | 2/2009 | Wang |
| 2009/0087029 A1 | 4/2009 | Coleman |
| 2010/0049397 A1 | 2/2010 | Lin |
| 2010/0111417 A1 | 5/2010 | Ward |
| 2010/0226564 A1 | 9/2010 | Marchesotti |
| 2010/0281361 A1 | 11/2010 | Marchesotti |
| 2011/0142283 A1 | 6/2011 | Huang |
| 2011/0206282 A1 | 8/2011 | Aisaka |
| 2011/0247031 A1 | 10/2011 | Jacoby |
| 2011/0257860 A1 | 10/2011 | Getman et al. |
| 2012/0041636 A1 | 2/2012 | Johnson et al. |
| 2012/0105639 A1 | 5/2012 | Stein |
| 2012/0140076 A1 | 6/2012 | Rosenbaum |
| 2012/0274629 A1 | 11/2012 | Baek |
| 2012/0314070 A1 | 12/2012 | Zhang et al. |
| 2013/0051613 A1 | 2/2013 | Bobbitt et al. |
| 2013/0083959 A1 | 4/2013 | Owechko |
| 2013/0182134 A1 | 7/2013 | Grundmann et al. |
| 2013/0204465 A1 | 8/2013 | Phillips et al. |
| 2013/0266187 A1 | 10/2013 | Bulan |
| 2013/0329052 A1 | 12/2013 | Chew |
| 2014/0072170 A1 | 3/2014 | Zhang |
| 2014/0104051 A1 | 4/2014 | Breed |
| 2014/0142799 A1 | 5/2014 | Ferguson et al. |
| 2014/0143839 A1 | 5/2014 | Ricci |
| 2014/0145516 A1 | 5/2014 | Hirosawa |
| 2014/0198184 A1 | 7/2014 | Stein |
| 2014/0316865 A1 | 10/2014 | Okamoto |
| 2014/0321704 A1 | 10/2014 | Partis |
| 2014/0334668 A1 | 11/2014 | Saund |
| 2015/0062304 A1 | 3/2015 | Stein |
| 2015/0269438 A1 | 9/2015 | Samarsekera et al. |
| 2015/0269845 A1 | 9/2015 | Calmettes et al. |
| 2015/0310370 A1 | 10/2015 | Burry |
| 2015/0353082 A1 | 12/2015 | Lee et al. |
| 2016/0008988 A1 | 1/2016 | Kennedy |
| 2016/0026787 A1 | 1/2016 | Nairn et al. |
| 2016/0037064 A1 | 2/2016 | Stein |
| 2016/0094774 A1 | 3/2016 | Li |
| 2016/0118080 A1 | 4/2016 | Chen |
| 2016/0129907 A1 | 5/2016 | Kim |
| 2016/0165157 A1 | 6/2016 | Stein |
| 2016/0210528 A1 | 7/2016 | Duan |
| 2016/0275766 A1 | 9/2016 | Venetianer et al. |
| 2016/0280261 A1 | 9/2016 | Kyrtsos et al. |
| 2016/0321381 A1 | 11/2016 | English |
| 2016/0334230 A1 | 11/2016 | Ross et al. |
| 2016/0342837 A1 | 11/2016 | Hong et al. |
| 2016/0347322 A1 | 12/2016 | Clarke et al. |
| 2016/0375907 A1 | 12/2016 | Erban |
| 2017/0053169 A1 | 2/2017 | Cuban et al. |
| 2017/0061632 A1 | 3/2017 | Linder et al. |
| 2017/0080928 A1 | 3/2017 | Wasiek et al. |
| 2017/0124476 A1 | 5/2017 | Levinson et al. |
| 2017/0134631 A1 | 5/2017 | Zhao et al. |
| 2017/0177951 A1 | 6/2017 | Yang et al. |
| 2017/0293296 A1* | 10/2017 | Stenneth .......... G06Q 10/06315 |
| 2017/0301104 A1 | 10/2017 | Qian |
| 2017/0305423 A1 | 10/2017 | Green |
| 2017/0318407 A1 | 11/2017 | Meister |
| 2017/0334484 A1 | 11/2017 | Koravadi |
| 2018/0057052 A1 | 3/2018 | Dodd et al. |
| 2018/0151063 A1 | 5/2018 | Pun |
| 2018/0158197 A1 | 6/2018 | Dasgupta |
| 2018/0260956 A1 | 9/2018 | Huang |
| 2018/0283892 A1 | 10/2018 | Behrendt |
| 2018/0373980 A1 | 12/2018 | Huval |
| 2019/0025853 A1 | 1/2019 | Julian |
| 2019/0065863 A1 | 2/2019 | Luo et al. |
| 2019/0066329 A1 | 2/2019 | Yi et al. |
| 2019/0066330 A1 | 2/2019 | Yi et al. |
| 2019/0066344 A1 | 2/2019 | Yi et al. |
| 2019/0084477 A1 | 3/2019 | Gomez-Mendoza et al. |
| 2019/0084534 A1* | 3/2019 | Kasper .............. B60R 16/0315 |
| 2019/0108384 A1 | 4/2019 | Wang et al. |
| 2019/0132391 A1 | 5/2019 | Thomas |
| 2019/0132392 A1 | 5/2019 | Liu |
| 2019/0170867 A1 | 6/2019 | Wang et al. |
| 2019/0210564 A1 | 7/2019 | Han |
| 2019/0210613 A1 | 7/2019 | Sun |
| 2019/0220037 A1* | 7/2019 | Vladimerou .......... G05D 1/0293 |
| 2019/0236950 A1 | 8/2019 | Li |
| 2019/0266420 A1 | 8/2019 | Ge |
| 2022/0270493 A1* | 8/2022 | Mok ................. G05D 1/0295 |

FOREIGN PATENT DOCUMENTS

| | | |
|---|---|---|
| CN | 105809950 A | 7/2016 |
| CN | 105915354 A | 8/2016 |
| CN | 106340197 A | 1/2017 |
| CN | 106781591 A | 5/2017 |
| CN | 106853827 A | 6/2017 |
| CN | 106853827 A1 | 6/2017 |
| CN | 107403547 A | 11/2017 |
| CN | 108010360 A | 5/2018 |
| CN | 108829107 A | 11/2018 |
| CN | 108845570 A | 11/2018 |
| DE | 2608513 A1 | 9/1977 |
| DE | 102016105259 A1 | 9/2016 |
| DE | 102017125662 A1 | 5/2018 |
| EP | 890470 B1 | 1/1999 |
| EP | 1754179 A1 | 2/2007 |
| EP | 2448251 A2 | 5/2012 |
| EP | 2463843 A2 | 6/2012 |
| EP | 2761249 A1 | 8/2014 |
| EP | 2946336 A2 | 11/2015 |
| EP | 2993654 A1 | 3/2016 |
| EP | 3081419 A1 | 10/2016 |
| EP | 3232381 A1 | 10/2017 |
| GB | 2513392 A | 10/2014 |
| KR | 100802511 A1 | 2/2008 |
| WO | 1991009375 A1 | 6/1991 |
| WO | 2005098739 A1 | 10/2005 |
| WO | 2005098751 A1 | 10/2005 |
| WO | 2005098782 A1 | 10/2005 |
| WO | 2010109419 A | 9/2010 |
| WO | 2013045612 A1 | 4/2013 |
| WO | 2014111814 A2 | 7/2014 |
| WO | 2014166245 A1 | 10/2014 |

(56) References Cited

FOREIGN PATENT DOCUMENTS

| WO | 2014201324 A1 | 12/2014 | |
|---|---|---|---|
| WO | 2015083009 A1 | 6/2015 | |
| WO | 2015103159 A1 | 7/2015 | |
| WO | 2015125022 A2 | 8/2015 | |
| WO | 2015186002 A2 | 12/2015 | |
| WO | 2016090282 A1 | 6/2016 | |
| WO | 2016135736 A2 | 9/2016 | |
| WO | 2017079349 A1 | 5/2017 | |
| WO | 2017079460 A2 | 5/2017 | |
| WO | WO-2018039114 A1 * | 3/2018 | ......... B60R 16/0231 |
| WO | 2017013875 A1 | 5/2018 | |
| WO | 2019040800 A1 | 2/2019 | |
| WO | 2019084491 A1 | 5/2019 | |
| WO | 2019084494 A1 | 5/2019 | |
| WO | 2019140277 A2 | 7/2019 | |
| WO | 2019168986 A1 | 9/2019 | |

OTHER PUBLICATIONS

Caselitz, T. et al., "Monocular camera localization in 3D LiDAR maps," European Conference on Computer Vision (2014) Computer Vision—ECCV 2014. ECCV 2014. Lecture Notes in Computer Science, vol. 8690. Springer, Cham.
Mur-Artal, R. et al., "ORB-SLAM: A Versatile and Accurate Monocular SLAM System," IEEE Transaction on Robotics, Oct. 2015, pp. 1147-1163, vol. 31, No. 5, Spain.
Sattler, T. et al., "Are Large-Scale 3D Models Really Necessary for Accurate Visual Localization?" CVPR, IEEE, 2017, pp. 1-10.
Engel, J. et la. "LSD-SLAM: Large Scare Direct Monocular SLAM," pp. 1-16, Munich.
Levinson, Jesse et al., Experimental Robotics, Unsupervised Calibration for Multi-Beam Lasers, pp. 179-194, 12th Ed., Oussama Khatib, Vijay Kumar, Gaurav Sukhatme (Eds.) Springer-Verlag Berlin Heidelberg 2014.
International Application No. PCT/US2019/013322, International Search Report and Written Opinion dated Apr. 2, 2019.
International Application No. PCT/US19/12934, International Search Report and Written Opinion dated Apr. 29, 2019.
International Application No. PCT/US18/53795, International Search Report and Written Opinion dated Dec. 31, 2018.
International Application No. PCT/US18/57848, International Search Report and Written Opinion dated Jan. 7, 2019.
International Application No. PCT/US2018/057851, International Search Report and Written Opinion dated Feb. 1, 2019.
International Application No. PCT/US2019/019839, International Search Report and Written Opinion dated May 23, 2019.
International Application No. PCT/US19/25995, International Search Report and Written Opinion dated Jul. 9, 2019.
Geiger, Andreas et al., "Automatic Camera and Range Sensor Calibration using a single Shot", Robotics and Automation (ICRA), pp. 1-8, 2012 IEEE International Conference.
Zhang, Z. et al. A Flexible new technique for camera calibration. IEEE Transactions on Pattern Analysis and Machine Intelligence (vol. 22, Issue: 11, Nov. 2000).
International Application No. PCT/US2018/047830, International Search Report and Written Opinion dated Dec. 28, 2018.
Bar-Hillel, Aharon et al. "Recent progress in road and lane detection: a survey." Machine Vision and Applications 25 (2011): 727-745.
Schindler, Andreas et al. "Generation of high precision digital maps using circular arc splines," 2012 IEEE Intelligent Vehicles Symposium, Alcala de Henares, 2012, pp. 246-251. doi: 10.1109/IVS.2012.6232124.
International Application No. PCT/US2018/047608, International Search Report and Written Opinion dated Dec. 28, 2018.
Hou, Xiaodi and Zhang, Liqing, "Saliency Detection: A Spectral Residual Approach", Computer Vision and Pattern Recognition, CVPR'07—IEEE Conference, pp. 1-8, 2007.
Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.
Hou, Xiaodi and Zhang, Liqing, "Dynamic Visual Attention: Searching for Coding Length Increments", Advances in Neural Information Processing Systems, vol. 21, pp. 681-688, 2008.
Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302.5985, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.
Li, Yanghao and Wang, Naiyan and Liu, Jiaying and Hou, Xiaodi, "Demystifying Neural Style Transfer", arXiv preprint arXiv:1701.01036, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.
Li, Yanghao and Wang, Naiyan and Liu, Jiaying and Hou, Xiaodi, "Factorized Bilinear Models for Image Recognition", arXiv preprint arXiv:1611.05709, 2016.
Hou, Xiaodi, "Computational Modeling and Psychophysics in Low and Mid-Level Vision", California Institute of Technology, 2014.
Spinello, Luciano, Triebel, Rudolph, Siegwart, Roland, "Multiclass Multimodal Detection and Tracking in Urban Environments", Sage Journals, vol. 29 Issue 12, pp. 1498-1515 Article first published online: Oct. 7, 2010; Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.
Kyoungho Ahn, Hesham Rakha, "The Effects of Route Choice Decisions on Vehicle Energy Consumption and Emissions", Virginia Tech Transportation Institute, Blacksburg, VA 24061, date unknown.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.
Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates,

(56) References Cited

OTHER PUBLICATIONS

Andrew Y. Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv:1703.04977v1 [cs.CV] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
Office Action Mailed in Chinese Application No. 201810025516.X, dated Sep. 3, 2019.
Luo, Yi et al. U.S. Appl. No. 15/684,389 Notice of Allowance dated Oct. 9, 2019.
International Application No. PCT/US19/58863, International Search Report and Written Opinion dated Feb. 14, 2020, pp. 1-11.
US Patent & Trademark Office, Non-Final Office Action dated Apr. 29, 2020 in U.S. Appl. No. 16/174,980, 6 pages.
US Patent & Trademark Office, Final Office Action dated Sep. 8, 2020 in U.S. Appl. No. 16/174,980, 8 pages.
No Author. Japanese Application No. 2021-533666, Office Action dated Dec. 6, 2022, pp. 1-6.
Chinese Application No. 201811530975.X, First Search Results dated Nov. 20, 2020, pp. 1-2.
Chinese Application No. 201811530975.X, First Office Action dated Dec. 21, 2020, pp. 1-7.
International Application No. PCT/CN2019/077076, International Search Report and Written Opinion dated Aug. 20, 2019, pp. 1-13.
International Application No. PCT/CN2019/077076, International Preliminary Report on Patentability dated Jun. 8, 2021, pp. 1-4.
European Patent Office, Extended European Search Report for EP 19894619, dated Jul. 11, 2022, 8 pages.

\* cited by examiner

| License Plate No. | Type | Position | Destination | Distance to move together | Platoon |
|---|---|---|---|---|---|
| BJXXXXXX | Passenger Car | 0.1km | XX Province XX City XX Toll Station | 3km | A01350 |
| BJXXXXXX | Container Truck | 0.15km | XX Province XX City XX Toll Station | 135km | N/A |
| BJXXXXXX | Bus | 0.3km | XX Province XX City XX Checkpoint | 40km | N/A |
| HBXXXXXX | Taxi | 0.3km | XX Province XX City XX Bridge | 3km | N/A |
| SHXXXXXX | Passenger Car | 0.5km | XX Province XX City XX Toll Station | 3km | N/A |

OK   Return

Fig. 3

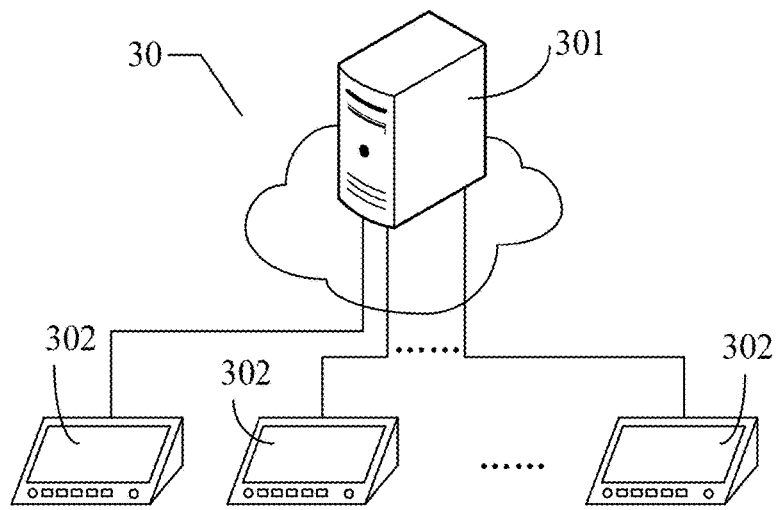

Fig. 4

PLATOONING METHOD, APPARATUS AND SYSTEM OF AUTONOMOUS DRIVING PLATOON

CROSS-REFERENCE TO RELATED APPLICATIONS

The present disclosure is a continuation of and claims priority to International Application No. PCT/CN2019/077076, entitled "PLATOONING METHOD, APPARATUS AND SYSTEM OF AUTONOMOUS DRIVING PLATOON", and filed Mar. 6, 2019, and which claims priority to and benefit of Chinese Patent Application No. 201811530975.X, titled "PLATOONING METHOD, APPARATUS AND SYSTEM OF AUTONOMOUS DRIVING PLATOON", filed on Dec. 14, 2018, the content of which is incorporated herein by reference in its entirety.

TECHNICAL FIELD

The present disclosure relates to Internet of Vehicles technology, and more particularly, to a method, an apparatus, and a system for platooning.

BACKGROUND

At present, a collaborative autonomous driving fleet, or platooning, refers to a plurality of vehicles tagging along at an extremely short distance in a platoon with support of autonomous driving technology and Vehicle-to-Vehicle (V2V) communication technology. In such a platoon, the distance between vehicles could be only 20 meters or shorter, much shorter than a typical safe driving distance. The extremely short distance allows an airflow cut through by a lead vehicle to be directly accepted by a following vehicle at the rear of the lead vehicle, without forming a low-pressure turbulence zone, thereby effectively reducing the overall air resistance of the entire platoon while moving. Generally, with the resistance reduced by platooning, fuel consumption can be reduced by nearly 10%. The main reason why the platoon can maintain such a short interval is the benefit from the low latency of V2V communication, which can achieve end-to-end communication within 100 ms. Therefore, based on the V2V technology, information can be exchanged between vehicles, and a group of vehicles in a platoon can follow a lead vehicle and control their operations in accordance with the operations of the lead vehicle. For example, if the lead vehicle operates such as accelerating, braking, or steering, the following vehicles can perform the same operation in a very short period of time.

In order to form a platoon, there is a need for a method for platooning to allow an individual vehicle to join a platoon or to form a platoon with other vehicles. However, most of the current methods for platooning are limited to areas where Road Side Units (RSUs) are provided and lack an authentication process for the vehicle to join a platoon, resulting in a security risk while the platoon is moving.

SUMMARY

The embodiments of the present disclosure provide a method, an apparatus, and a system for platooning, capable of platooning with security authentication independently of RSUs.

In order to achieve the above object, the following technical solutions are provided.

In an aspect, a method for platooning is provided according to an embodiment of the present disclosure. The method is applied in a system for platooning. The system includes a cloud server and vehicle-mounted devices on a number of vehicles that are communicatively connected to the cloud server. The method includes: receiving a platooning request message transmitted by a vehicle-mounted device on a vehicle to join a platoon; obtaining, based on the platooning request message, a first vehicle type and first kinematic information of the vehicle to join the platoon, a second vehicle type and second kinematic information of a vehicle currently at a tail of the platoon, first sensor operating status information of the vehicle to join the platoon, and second sensor operating status information of each vehicle in the platoon; performing vehicle kinematic determination based on the first vehicle type, the first kinematic information, the second vehicle type, and the second kinematic information, to obtain a kinematic determination result; performing sensor determination based on the first sensor operating status information and the second sensor operating status information, to obtain a sensor determination result; transmitting a confirmation request message to a vehicle-mounted device on a lead vehicle of the platoon when the kinematic determination result and the sensor determination result are both successful; and controlling, upon receiving a request approval message from the vehicle mounted device on the lead vehicle of the platoon, the vehicle-mounted device on the vehicle to join the platoon to establish a V2V communication connection with a vehicle-mounted device on each vehicle in the platoon, such that the vehicle to join the platoon joins the platoon at the tail of the platoon.

Further, the method may include, prior to receiving the platooning request message transmitted by the vehicle-mounted device on the vehicle to join the platoon: receiving a vehicle registration message transmitted by the vehicle-mounted device on the vehicle to join the platoon, the vehicle registration message containing a vehicle license plate number, a vehicle type, a vehicle electronic tag, vehicle driver information, vehicle power system information, and vehicle sensor information; and performing determination on the vehicle registration message, storing the vehicle registration message when the determination on the vehicle registration message is successful, and determining the vehicle to join the platoon corresponding to the vehicle registration message on which the determination is successful as a vehicle allowed for platooning.

Further, the method may include, prior to receiving the platooning request message transmitted by the vehicle-mounted device on the vehicle to join the platoon: receiving position information, destination information, and platoon information uploaded in real time by a vehicle-mounted device on each of a number of vehicles allowed for platooning; determining navigation path information for each of the number of vehicles allowed for platooning based on the position information and the destination information uploaded in real time; and transmitting, to the vehicle-mounted device on the vehicle to join the platoon, vehicle display information for a predetermined distance range from the vehicle to join the platoon based on the position information, the destination information, the platoon information, and the navigation path information, such that the vehicle-mounted device on the vehicle to join the platoon displays the vehicle display information, the vehicle display information containing the vehicle license plate number, vehicle type, position information, destination information, and platoon information of each vehicle allowed for platooning and information on a distance to move together with the vehicle to join the platoon as determined based on the navigation path information for each vehicle allowed for platooning.

In particular, the operation of receiving the platooning request message transmitted by the vehicle-mounted device on the vehicle to join the platoon may include: receiving the platooning request message generated by the vehicle-mounted device on the vehicle to join the platoon by selecting based on the vehicle display information, the platooning request message containing the selected vehicle display information; determining, when the platoon information in the selected vehicle display information is empty, the vehicle corresponding to the selected vehicle display information as the vehicle currently at the tail; and determining, when the platoon information in the selected vehicle display information is not empty, the platoon to join based on the platoon information, and determining the vehicle at the tail of the platoon as the vehicle currently at the tail.

Further, the platooning request message may include a vehicle electronic tag of the vehicle to join the platoon. The operation of obtaining, based on the platooning request message, the first vehicle type and the first kinematic information of the vehicle to join the platoon, the second vehicle type and the second kinematic information of the vehicle currently at the tail of the platoon, the first sensor operating status information of the vehicle to join the platoon, and the second sensor operating status information of each vehicle in the platoon may include: retrieving the vehicle registration message of the vehicle to join the platoon based on the vehicle electronic tag of the vehicle to join the platoon, and obtaining the first vehicle type and the first kinematic information of the vehicle to join the platoon, the first vehicle type being a vehicle type of the vehicle to join the platoon, and the first kinematic information including a minimum turning radius and a braking preparation time length of the vehicle to join the platoon as determined based on the vehicle power system information of the vehicle to join the platoon; obtaining a vehicle electronic tag of the vehicle currently at the tail, retrieving a vehicle registration message of the vehicle currently at the tail, and obtaining the second vehicle type and the second kinematic information of the vehicle currently at the tail, the second vehicle type being a vehicle type of the vehicle currently at the tail, and the second kinematic information including a minimum turning radius and a braking preparation time length of the vehicle currently at the tail as determined based on vehicle power system information of the vehicle currently at the tail; and transmitting a sensor and operating status request message to the vehicle-mounted device on the vehicle to join the platoon and the vehicle-mounted device on each vehicle in the platoon, receiving the first sensor operating status information obtained by the vehicle-mounted device on the vehicle to join the platoon from an electronic system of the vehicle to join the platoon, and receiving the second sensor operating status information obtained by the vehicle-mounted device on each vehicle in the platoon from an electronic system of the vehicle, the first sensor operating status information and the second sensor operating status information each including an operating status of a sensor for minimum perception information, an operating status and accuracy of a positioning sensor, and an operating status and accuracy of a forward distance sensor.

In particular, the vehicle type may be divided into a plurality of vehicle levels according to vehicle volumes and vehicle weights. The higher the vehicle level is, the larger the vehicle volume and vehicle weight will be, or the lower the vehicle level is, the larger the vehicle volume and vehicle weight will be. The operation of performing vehicle kinematic determination based on the first vehicle type, the first kinematic information, the second vehicle type, and the second kinematic information, to obtain the kinematic determination result may include: obtaining a first vehicle level to which the first vehicle type belongs and a second vehicle level to which the second vehicle type belongs based on the first vehicle type and the second vehicle type, respectively; determining, when the higher the vehicle level is, the larger the vehicle volume and vehicle weight will be, a vehicle type determination result to be successful when the first vehicle level is lower than or equal to the second vehicle level; determining, when the lower the vehicle level is, the larger the vehicle volume and vehicle weight will be, a vehicle type determination result to be successful when the first vehicle level is higher than or equal to the second vehicle level; comparing the minimum turning radius of the vehicle to join the platoon with the minimum turning radius of the vehicle currently at the tail, and determining a minimum turning radius determination result to be successful when the minimum turning radius of the vehicle to join the platoon is smaller than or equal to the minimum turning radius of the vehicle currently at the tail; comparing the braking preparation time length of the vehicle to join the platoon with the braking preparation time length of the vehicle currently at the tail, and determining a braking preparation time length determination result to be successful when the braking preparation time length of the vehicle to join the platoon is smaller than or equal to the braking preparation time length of the vehicle currently at the tail; and generating the kinematic determination result as successful when the vehicle type determination result, the minimum turning radius determination result, and the braking preparation time length determination result are all successful.

In particular, the operation of performing sensor determination based on the first sensor operating status information and the second sensor operating status information, to obtain the sensor determination result may include: determining whether the operating status of the sensor for minimum perception information on the vehicle to join the platoon and the operating status of the sensor for minimum perception information on each vehicle in the platoon are operating normally or operating with redundancy, whether the operating status and accuracy of the positioning sensor on the vehicle to join the platoon and the operating status and accuracy of the positioning sensor on each vehicle in the platoon are normal, and whether the operating status and accuracy of the forward distance sensor on the vehicle to join the platoon and the operating status and accuracy of the forward distance sensor on each vehicle in the platoon are normal; and generating the sensor determination result as successful when the operating status of the sensor for minimum perception information on the vehicle to join the platoon and the operating status of the sensor for minimum perception information on each vehicle in the platoon are operating normally or operating with redundancy, the operating status and accuracy of the positioning sensor on the vehicle to join the platoon and the operating status and accuracy of the positioning sensor on each vehicle in the platoon are normal, and the operating status and accuracy of the forward distance sensor on the vehicle to join the platoon and the operating status and accuracy of the forward distance sensor on each vehicle in the platoon are normal.

Further, the method may include: transmitting a prompt message to the vehicle-mounted device on the vehicle to join the platoon and the vehicle-mounted device on each vehicle in the platoon after receiving the request approval message from the vehicle-mounted device on the lead vehicle of the platoon, the prompt message containing a vehicle license plate number and a vehicle type of the vehicle to join the platoon.

In another aspect, a computer-readable storage medium is provided according to an embodiment of the present disclosure. The computer-readable storage medium has a computer program stored thereon. The program, when executed by a processor, implements the above method for platooning.

In yet another aspect, a computer device is provided according to an embodiment of the present disclosure. The computer device includes a memory, a processor, and a computer program stored on the storage and executable on the processor. The processor is configured to, when executing the computer program, perform the above method for platooning.

In still another aspect, a cloud server is provided according to an embodiment of the present disclosure. The cloud server is communicatively connected to vehicle-mounted devices on a number of vehicles. The cloud server is configured to perform the above method for platooning.

In still yet another aspect, a system for platooning is provided according to an embodiment of the present disclosure. The system includes a cloud server and vehicle-mounted devices on a number of vehicles that are communicatively connected to the cloud server. The cloud server is configured to perform the method for platooning.

The embodiments of the present disclosure provide a method, an apparatus, and a system for platooning. With a cloud server and vehicle-mounted devices on a number of vehicles, a platooning request message transmitted by a vehicle-mounted device on a vehicle to join a platoon is received. Based on the platooning request message, a first vehicle type and first kinematic information of the vehicle to join the platoon, a second vehicle type and second kinematic information of a vehicle currently at a tail of the platoon, first sensor operating status information of the vehicle to join the platoon, and second sensor operating status information of each vehicle in the platoon are obtained. Vehicle kinematic determination is performed based on the first vehicle type, the first kinematic information, the second vehicle type, and the second kinematic information, to obtain a kinematic determination result. Sensor determination is performed based on the first sensor operating status information and the second sensor operating status information, to obtain a sensor determination result. A confirmation request message is transmitted to a vehicle-mounted device on a lead vehicle of the platoon when the kinematic determination result and the sensor determination result are both successful. Upon receiving a request approval message from the vehicle-mounted device on the lead vehicle of the platoon, the vehicle-mounted device on the vehicle to join the platoon is controlled to establish a V2V communication connection with a vehicle-mounted device on each vehicle in the platoon, such that the vehicle to join the platoon joins the platoon at the tail of the platoon. The embodiments of the present disclosure do not rely on processing and responding by any RSU, and can achieve platooning in an area without RSUs. Moreover, the embodiments of the present disclosure authenticate whether a vehicle meets a requirement for joining a platoon based on vehicle kinematics and sensors, so as to avoid the problem associated with the lack of an authentication process for the vehicle to join a platoon, which would otherwise result in a security risk while the platoon is moving.

The other features and advantages of the present disclosure will be explained in the following description and will become apparent partly from the description or be understood by implementing the present disclosure. The objects and other advantages of the present disclosure can be achieved and obtained from the structures specifically illustrated in the written description, claims, and figures.

In the following, the solutions according to the present disclosure will be described in detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limit, the present disclosure. It is apparent to those skilled in the art that the figures described below only illustrate some embodiments of the present disclosure and other figures can be obtained from these figures without applying any inventive skills. In the figures:

FIG. 3 is a schematic diagram showing an interface for displaying vehicle display information on a vehicle-mounted device on a vehicle to join a platoon according to an embodiment of the present disclosure;

FIG. 4 is a schematic diagram showing a structure of a system for platooning according to an embodiment of the present disclosure;

DETAILED DESCRIPTION OF THE EMBODIMENTS

In the following, the solutions according to the embodiments of the present disclosure will be described clearly and completely with reference to the figures. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In order to allow those skilled in the art to better understand the present disclosure, some of the technical terms used in the embodiments of the present disclosure will be explained as follows:

V2V: Vehicle-to-Vehicle (V2V) communication technology is a communication technology that is not limited to fixed base stations, providing direct end-to-end wireless communication for moving vehicles.

V2X: Vehicle to X is a key technology of the future intelligent transportation system. It enables communication between vehicles, vehicles and base stations, and base stations and base stations. In this way, a variety of traffic information such as real-time road conditions, road information, and pedestrian information can be obtained, thereby improving driving safety, reducing congestion, improving traffic efficiency, and providing on-board entertainment information.

RSU: Road Side Unit, in the embodiment of the present disclosure, refers to a road side unit device capable of V2X communication with a vehicle.

In the process of implementing the embodiments of the present disclosure, the applicant found that most of the current platooning schemes are limited to areas where Road Side Units (RSUs) are provided. That is, processing and responding by RSUs are generally required for platooning. It is thus difficult to form a platoon in an area without RSUs. In addition, there is no review process for vehicles to join a platoon. Currently, not all vehicles can meet driving conditions for platooning. Some vehicles that are not suitable for current driving conditions of a platoon may join the platoon, resulting in a security risk while the platoon is moving.

Figure 1:
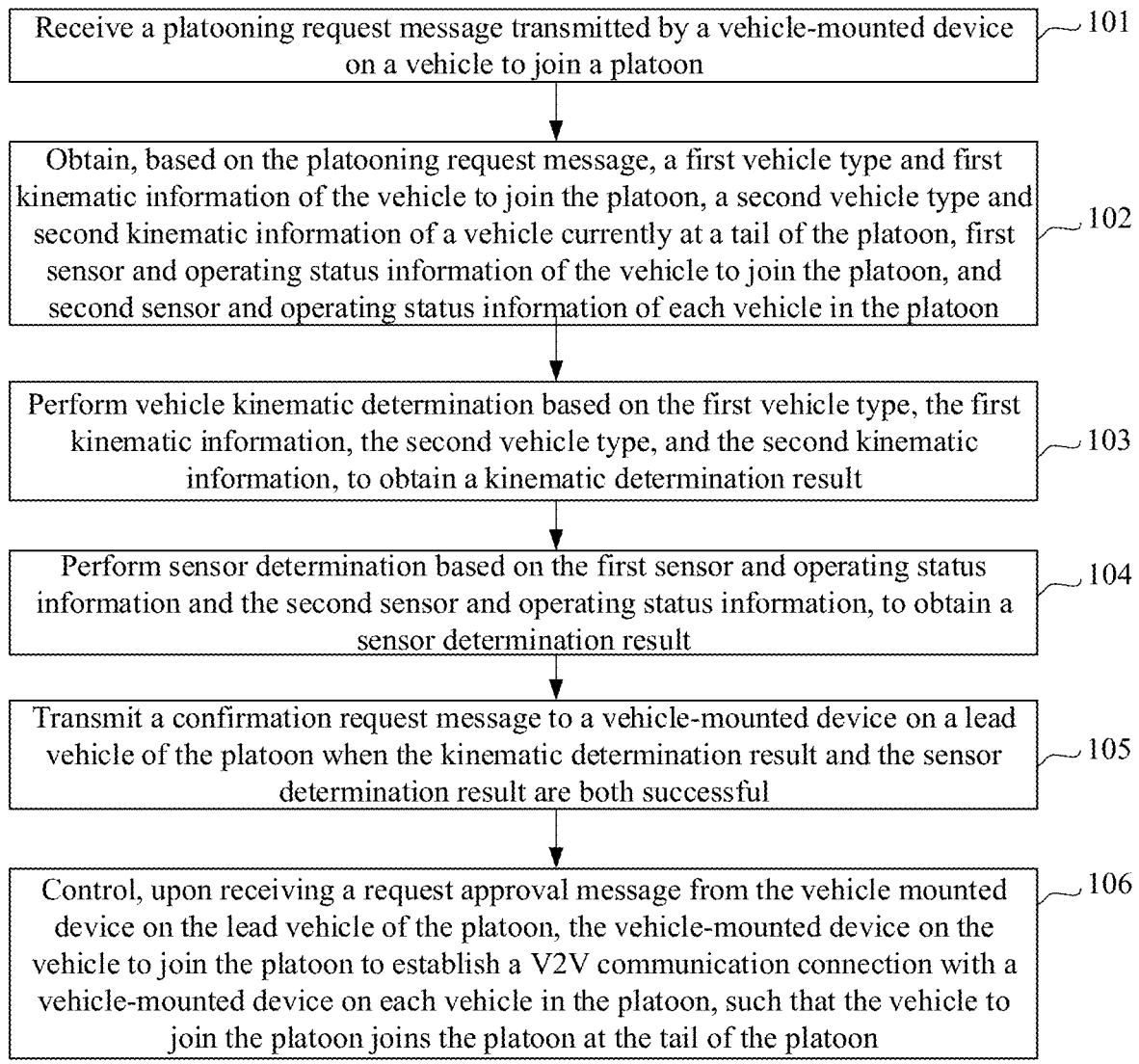
FIG. 1 is a first flowchart illustrating a method for platooning according to an embodiment of the present disclosure.

In view of the above problem, as shown in FIG. 1, an embodiment of the present disclosure provides a method for platooning, applied in a system for platooning. The system includes a cloud server and vehicle-mounted devices on a number of vehicles that are communicatively connected to the cloud server. The cloud server and the vehicle-mounted devices on the number of vehicles can communicate via a 4G ($4^{th}$ Generation mobile communication technology) network or a 5G ($5^{th}$ Generation mobile communication technology) network.

The method includes the following steps.

At step 101, a platooning request message transmitted by a vehicle-mounted device on a vehicle to join a platoon is received.

At step 102, based on the platooning request message, a first vehicle type and first kinematic information of the vehicle to join the platoon, a second vehicle type and second kinematic information of a vehicle currently at a tail of the platoon, first sensor operating status information of the vehicle to join the platoon, and second sensor operating status information of each vehicle in the platoon are obtained.

At step 103, vehicle kinematic determination is performed based on the first vehicle type, the first kinematic information, the second vehicle type, and the second kinematic information, to obtain a kinematic determination result.

At step 104, sensor determination is performed based on the first sensor operating status information and the second sensor operating status information, to obtain a sensor determination result.

At step 105, a confirmation request message is transmitted to a vehicle-mounted device on a lead vehicle of the platoon when the kinematic determination result and the sensor determination result are both successful.

At step 106, upon receiving a request approval message from the vehicle-mounted device on the lead vehicle of the platoon, the vehicle-mounted device on the vehicle to join the platoon is controlled to establish a V2V communication connection with a vehicle-mounted device on each vehicle in the platoon, such that the vehicle to join the platoon joins the platoon at the tail of the platoon.

Figure 2:
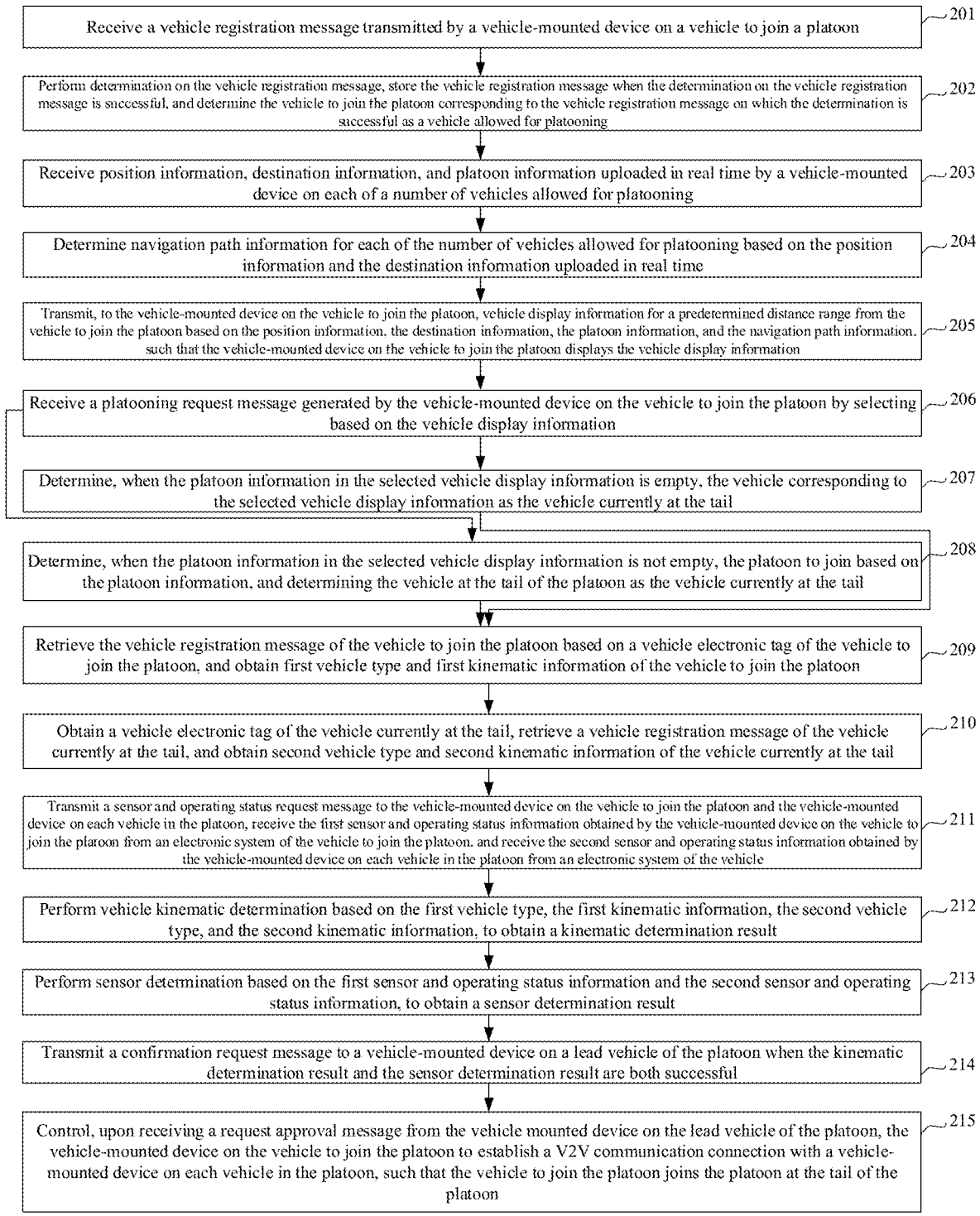
FIG. 2 is a second flowchart illustrating a method for platooning according to an embodiment of the present disclosure.

In order to facilitate better understanding of the present disclosure by those skilled in the art, an embodiment will be described below. As shown in FIG. 2, an embodiment of the present disclosure provides a method for platooning, applied in a system for platooning. The system includes a cloud server and vehicle-mounted devices on a number of vehicles that are communicatively connected to the cloud server.

The method includes the following steps.

At step 201, a vehicle registration message transmitted by a vehicle-mounted device on a vehicle to join a platoon is received.

Here, the vehicle registration message contains a vehicle license plate number, a vehicle type, a vehicle electronic tag, vehicle driver information, vehicle power system information, vehicle sensor information, etc. The present disclosure is not limited to any of these examples.

Here, the types of vehicles involved in the embodiments of the present disclosure may include passenger cars (for example, private cars), taxis, vans, buses, container trucks, heavy trucks, and the like. The vehicle electronic tag may refer to an electronic license plate issued by an official authority, in which identity information of the vehicle can be stored. The identity information is readable only but not writable, and each vehicle corresponds to a vehicle electronic tag. The vehicle driver information may include name, age, driving age, ID card number, driver license number, etc. The vehicle power system information may include maximum acceleration, maximum deceleration, a minimum turning radius, a braking preparation time length, etc. The vehicle sensor information may include a sensor type, a mounting position of each sensor, an identification number of each sensor, etc.

At step 202, determination is performed on the vehicle registration message, the vehicle registration message is stored when the determination on the vehicle registration message is successful, and the vehicle to join the platoon corresponding to the vehicle registration message on which the determination is successful is determined as a vehicle allowed for platooning.

Here, steps 201 and 202 are used to register each vehicle, so as to form registered vehicles allowed for platooning on the cloud server.

In step 202, a predetermined determination rule for the vehicle registration message may be used to perform determination on the vehicle license plate number, vehicle type, vehicle electronic tag, vehicle driver information, vehicle power system information, and vehicle sensor information. For example, a predetermined identity database can be used to identify the vehicle driver information. Alternatively, for example, manual reviewing can also be performed, and the determination result for the vehicle registration message can be generated by means of manual review and confirmation. Alternatively, for example, some predetermined neural networks can be trained based on predetermined samples of vehicle registration messages, and the trained neural networks can then be applied to subsequent determination processes for vehicle registration messages. There may be various specific determination processes and schemes for vehicle registration messages, and details thereof will be omitted here.

At step 203, position information, destination information, and platoon information uploaded in real time by a vehicle-mounted device on each of several vehicles allowed for platooning are received.

In particular, the position information may indicate a current position of each vehicle allowed for platooning. The platoon information may include a unique number of a platoon to which the vehicle belongs, or may indicate "N/A", "none", etc. when the vehicle does not belong to any platoon.

At step 204, navigation path information for each of the number of vehicles allowed for platooning is determined based on the position information and the destination information uploaded in real time.

In particular, based on the position information and the destination information, various navigation path algorithms can be used to obtain the navigation path information of each vehicle allowed for platooning. There are many specific navigation path algorithms, and details thereof will be omitted here.

At step 205, vehicle display information for a predetermined distance range from the vehicle to join the platoon is transmitted to the vehicle-mounted device on the vehicle to join the platoon based on the position information, the destination information, the platoon information, and the navigation path information, such that the vehicle-mounted device on the vehicle to join the platoon displays the vehicle display information.

Here, the vehicle display information may contain the vehicle license plate number, vehicle type, position information (which can be converted to a distance to the vehicle to join the platoon), destination information, and platoon information of each vehicle allowed for platooning and information on a distance to move together with the vehicle to join the platoon as determined based on the navigation path information for each vehicle allowed for platooning (which in particular can be calculated based on the navigation path information, and details thereof will be omitted here). The vehicle display information can be displayed on the vehicle-mounted device on the vehicle to join the platoon via a Human Machine Interface (HMI). For example, as shown in FIG. 3, the vehicle display information can be displayed on the vehicle-mounted device on the vehicle to join the platoon.

At step 206, a platooning request message generated by the vehicle-mounted device on the vehicle to join the platoon by selecting based on the vehicle display information is received.

Here, the platooning request message contains the selected vehicle display information and the vehicle electronic tag of the vehicle to join the platoon. For example, in FIG. 3 as described above, the vehicle display information in the box can be selected to generate the platooning request message, meaning that the vehicle to join the platoon needs to form a platoon with the corresponding container truck in the box.

After step 206, the method proceeds with step 207 or step 208.

At step 207, when the platoon information in the selected vehicle display information is empty, the vehicle corresponding to the selected vehicle display information is determined as the vehicle currently at the tail.

When the platoon information is empty, it means that the vehicle currently does not belong to any platoon (for example, a vehicle having a platoon displayed as N/A in FIG. 3 does not currently belong to any platoon). Since joining a platoon generally requires joining the platoon at the tail of the platoon, when the platoon information in the selected vehicle display information is empty, the vehicle corresponding to the selected vehicle display information can be determined as the vehicle currently at the tail, thereby ensuring that when a vehicle joins the platoon subsequently, it will join the platoon behind the vehicle currently at the tail.

After step 207, the method proceeds with step 209.

At step 208, when the platoon information in the selected vehicle display information is not empty, the platoon to join is determined based on the platoon information, and the vehicle at the tail of the platoon is determined as the vehicle currently at the tail.

When the platoon information is not empty, it means that the vehicle currently belongs to a platoon (generally it can only belong to one platoon, the case where one vehicle belongs to more than one platoon is out of scope of the present disclosure). For example, the vehicle having a platoon displayed as A01350 in FIG. 3 belongs to the platoon A01350 (A01350 represents a platoon number, the platoon number may have many formats and this is only an example). Based on the platoon information, the platoon to join is determined as A01350. In the platoon A01350, the passenger car may not be the vehicle at the tail of the platoon, so the cloud server can determine the vehicle currently at the tail of the platoon A01350 based on the platoon information.

After step 208, the method proceeds with step 209.

At step 209, the vehicle registration message of the vehicle to join the platoon is retrieved based on a vehicle electronic tag of the vehicle to join the platoon, and a first vehicle type and first kinematic information of the vehicle to join the platoon are obtained.

The first vehicle type is a vehicle type of the vehicle to join the platoon, and the first kinematic information includes a minimum turning radius and a braking preparation time length of the vehicle to join the platoon as determined based on the vehicle power system information of the vehicle to join the platoon. Here, the cloud server may pre-store the vehicle registration message of each vehicle allowed for platooning and may use vehicle electronic tags as indices to facilitate searching for the vehicle registration messages.

At step 210, a vehicle electronic tag of the vehicle currently at the tail is obtained, a vehicle registration message of the vehicle currently at the tail is retrieved, and second vehicle type and second kinematic information of the vehicle currently at the tail are obtained.

The second vehicle type is a vehicle type of the vehicle currently at the tail, and the second kinematic information includes a minimum turning radius and a braking preparation time length of the vehicle currently at the tail as determined based on vehicle power system information of the vehicle currently at the tail.

At step 211, a sensor operating status request message is transmitted to the vehicle-mounted device on the vehicle to join the platoon and the vehicle-mounted device on each vehicle in the platoon, first sensor operating status information obtained by the vehicle-mounted device on the vehicle to join the platoon from an electronic system of the vehicle to join the platoon is received, and second sensor operating status information obtained by the vehicle-mounted device on each vehicle in the platoon from an electronic system of the vehicle is received.

Here, either of the first sensor operating status information and the second operating status information includes operating status of a sensor for minimum perception information, operating status and accuracy of a positioning sensor, and operating status and accuracy of a forward distance sensor. The sensor for minimum perception information refers to one sensor required at minimum to ensure normal operation of autonomous driving, such as a camera or a Lidar. The positioning sensor refers to a sensor configured for vehicle positioning, such as a Lidar, a Global Positioning System (GPS) sensor, or the like. The forward distance sensor refers to a sensor mounted at a front of the vehicle and facing a moving direction of the vehicle for sensing a distance to an object in front of the vehicle, such as a Lidar, a forward camera, etc. Here, various sensors can be monitored to obtain the operation status and accuracy of each sensor. There are many specific schemes to achieve the purpose of monitoring, such as detecting periodic messages from the sensors. For example, many sensors can directly output their sensing accuracy. For example, many sensors can only output results, and additional algorithms are needed to evaluate the accuracy of the sensors. Details of specific schemes for obtaining the operation status and accuracy will be omitted here.

At step 212, vehicle kinematic determination is performed based on the first vehicle type, the first kinematic information, the second vehicle type, and the second kinematic information, to obtain a kinematic determination result.

In an embodiment of the present disclosure, the vehicle type can be divided into a plurality of vehicle levels according to vehicle volumes and vehicle weights. The higher the vehicle level is, the larger the vehicle volume and vehicle weight will be, or the lower the vehicle level is, the larger the vehicle volume and vehicle weight will be. For example, passenger cars and taxis (small vehicles) can be classified as Level 1, vans and buses (medium-sized vehicles) can be classified as Level 2, and container trucks and heavy trucks (heavy vehicles) can be classified as Level 3. Alternatively, passenger cars and taxis (small vehicles) can be classified as Level 3, vans and buses (medium-sized vehicles) can be classified as Level 2, and container trucks and heavy trucks (heavy vehicles) can be classified as Level 1. Details of the specific schemes for division of the levels will be omitted here.

Here, step 212 can be implemented as the following process, including, in particular, vehicle type determination (step A1 to step A3), minimum turning radius determination (step A4), and braking preparation time length determination (step A5).

At step A1, a first vehicle level to which the first vehicle type belongs and a second vehicle level to which the second vehicle type belongs are obtained based on the first vehicle type and the second vehicle type, respectively.

After step A1, the process proceeds with step A2 or step A3.

At step A2, when the higher the vehicle level is, the larger the vehicle volume and vehicle weight will be, a vehicle type determination result is determined to be successful when the first vehicle level is lower than or equal to the second vehicle level.

At step A3, when the lower the vehicle level is, the larger the vehicle volume and vehicle weight will be, a vehicle type determination result is determined to be successful when the first vehicle level is higher than or equal to the second vehicle level.

With the above step A2 or step A3, a vehicle with a larger volume and a larger weight is not allowed to follow a vehicle with a smaller volume and a smaller weight. For example, a heavy truck cannot follow a passenger car.

At step A4, the minimum turning radius of the vehicle to join the platoon is compared with the minimum turning radius of the vehicle currently at the tail, and a minimum turning radius determination result is determined to be successful when the minimum turning radius of the vehicle to join the platoon is smaller than or equal to the minimum turning radius of the vehicle currently at the tail.

At step A5, the braking preparation time length of the vehicle to join the platoon is compared with the braking preparation time length of the vehicle currently at the tail, and a braking preparation time length determination result is determined to be successful when the braking preparation time length of the vehicle to join the platoon is smaller than or equal to the braking preparation time length of the vehicle currently at the tail.

After the above steps A2 to A5, the process proceeds with step A6.

At step A6, the kinematic determination result is generated as successful when the vehicle type determination result, the minimum turning radius determination result, and the braking preparation time length determination result are all successful.

With the vehicle type determination, minimum turning radius determination, and braking preparation time length determination, proper platooning can be guaranteed, dangerous situations such as a large vehicle following a small vehicle can be avoided, and problems such as rear-end collisions can be effectively avoided while the platoon is moving.

At step 213, sensor determination is performed based on the first sensor operating status information and the second sensor operating status information, to obtain a sensor determination result.

Step 213 can be implemented as follows.

It can be determined whether the operating status of the sensor for minimum perception information on the vehicle to join the platoon and the operating status of the sensor for minimum perception information on each vehicle in the platoon are operating normally or operating with redundancy (here, operating with redundancy means that, when the sensor fails, the failed sensor can be replaced with a redundant sensor to continue operating), whether the operating status and accuracy of the positioning sensor on the vehicle to join the platoon and the operating status and accuracy of the positioning sensor on each vehicle in the platoon are normal, and whether the operating status and accuracy of the forward distance sensor on the vehicle to join the platoon and the operating status and accuracy of the forward distance sensor on each vehicle in the platoon are normal. The specific determination rules for the operating statuses and accuracies can be configured in advance, and details thereof will be omitted here.

When the operating status of the sensor for minimum perception information on the vehicle to join the platoon and the operating status of the sensor for minimum perception information on each vehicle in the platoon are operating normally or operating with redundancy, the operating status and accuracy of the positioning sensor on the vehicle to join the platoon and the operating status and accuracy of the positioning sensor on each vehicle in the platoon are normal, and the operating status and accuracy of the forward distance sensor on the vehicle to join the platoon and the operating status and accuracy of the forward distance sensor on each vehicle in the platoon are normal, the sensor determination result can be generated as successful.

At step 214, when the kinematic determination result and the sensor determination result are both successful, a confirmation request message can be transmitted to a vehicle-mounted device on a lead vehicle of the platoon.

By transmitting the confirmation request message to the vehicle-mounted device on the lead vehicle of the platoon, the leading vehicle of the platoon can confirm whether to approve the request from the vehicle to join the platoon for joining the platoon.

At step 215, upon receiving a request approval message from the vehicle-mounted device on the lead vehicle of the platoon, a prompt message is transmitted to the vehicle-mounted device on the vehicle to join the platoon and the vehicle-mounted device on each vehicle in the platoon, the vehicle-mounted device on the vehicle is controlled to join the platoon to establish a V2V communication connection with a vehicle-mounted device on each vehicle in the platoon, such that the vehicle to join the platoon joins the platoon at the tail of the platoon.

Here, the prompt message may contain, as a non-limiting example, a vehicle license plate number and a vehicle type of the vehicle to join the platoon. The prompt message can prompt each vehicle in the platoon that a new member is joining. The vehicle to join the platoon can join the platoon at the tail of the platoon by utilizing V2V communication between the vehicle-mounted devices, and details thereof will be omitted here.

In addition, if the request approval message is not received for a certain period of time, or if a request rejection message is received, it means that the lead vehicle rejects the request from the vehicle to join the platoon for joining the platoon, the entire process ends, and the vehicle to join the platoon fails to join the platoon. If the vehicle to join the platoon receives V2V communication information from nearby vehicles without successfully joining the platoon, the V2V communication information will be discarded by the vehicle-mounted device on the vehicle to join the platoon.

It is to be noted that, in an embodiment of the present disclosure, the communication between the vehicle-mounted devices or between the vehicle-mounted device and the cloud server may use symmetric encryption, asymmetric encryption, Certificate Authority (CA, or electronic authentication service organization) authentication, etc., to ensure the security of communication. The present disclosure is not limited to any of these examples.

In another aspect, an embodiment of the present disclosure also provides a computer-readable storage medium having a computer program stored thereon. The program, when executed by a processor, implements the above method for platooning corresponding to FIG. 1 or FIG. 2.

In yet another aspect, an embodiment of the present disclosure also provides a computer device. The computer device includes a memory, a processor, and a computer program stored on the memory and executable on the processor. The processor is configured to, when executing the computer program, perform the above method for platooning corresponding to FIG. 1 or FIG. 2.

In still another aspect, as shown in FIG. 4, an embodiment of the present disclosure also provides a cloud server 301. The cloud server 301 is communicatively connected to vehicle-mounted devices 302 on a number of vehicles. The cloud server 301 is configured to perform the above method for platooning corresponding to FIG. 1 or FIG. 2.

In still yet another aspect, as shown in FIG. 4, an embodiment of the present disclosure provides a system 30 for platooning. The system 30 includes a cloud server 301 and vehicle-mounted devices 302 on a number of vehicles that are communicatively connected to the cloud server 301. The cloud server 301 is configured to perform the above method for platooning corresponding to FIG. 1 or FIG. 2.

Figure 5:
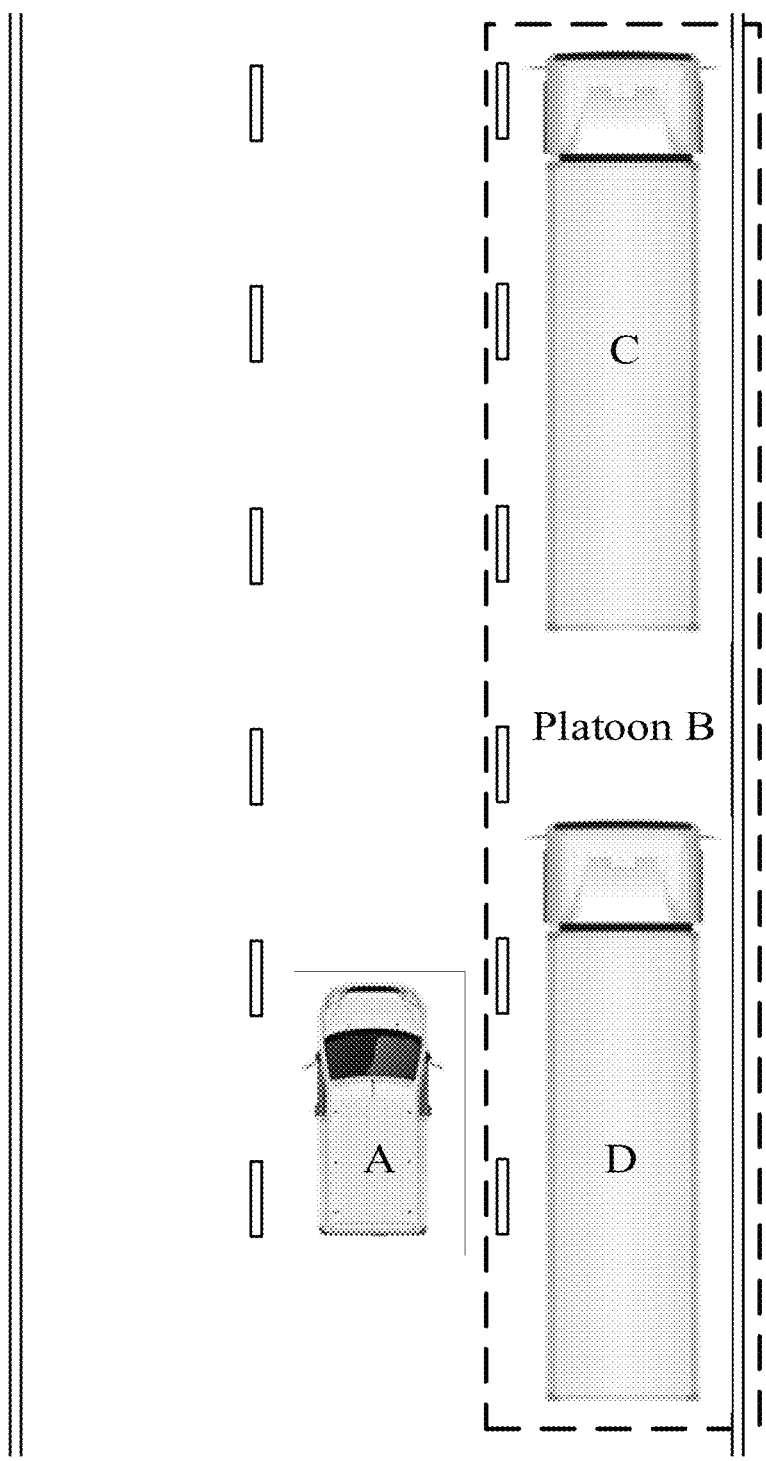
FIG. 5 is a schematic diagram showing a scenario where Vehicle A to join a platoon joins Platoon B according to an embodiment of the present disclosure.

In order to facilitate understanding of an application environment of the present disclosure by those skilled in the art, as shown in FIG. 5, an example will be given below, in which Vehicle A to join a platoon is to join Platoon B, which currently includes two vehicles, Vehicle C and Vehicle D.

Figure 6:
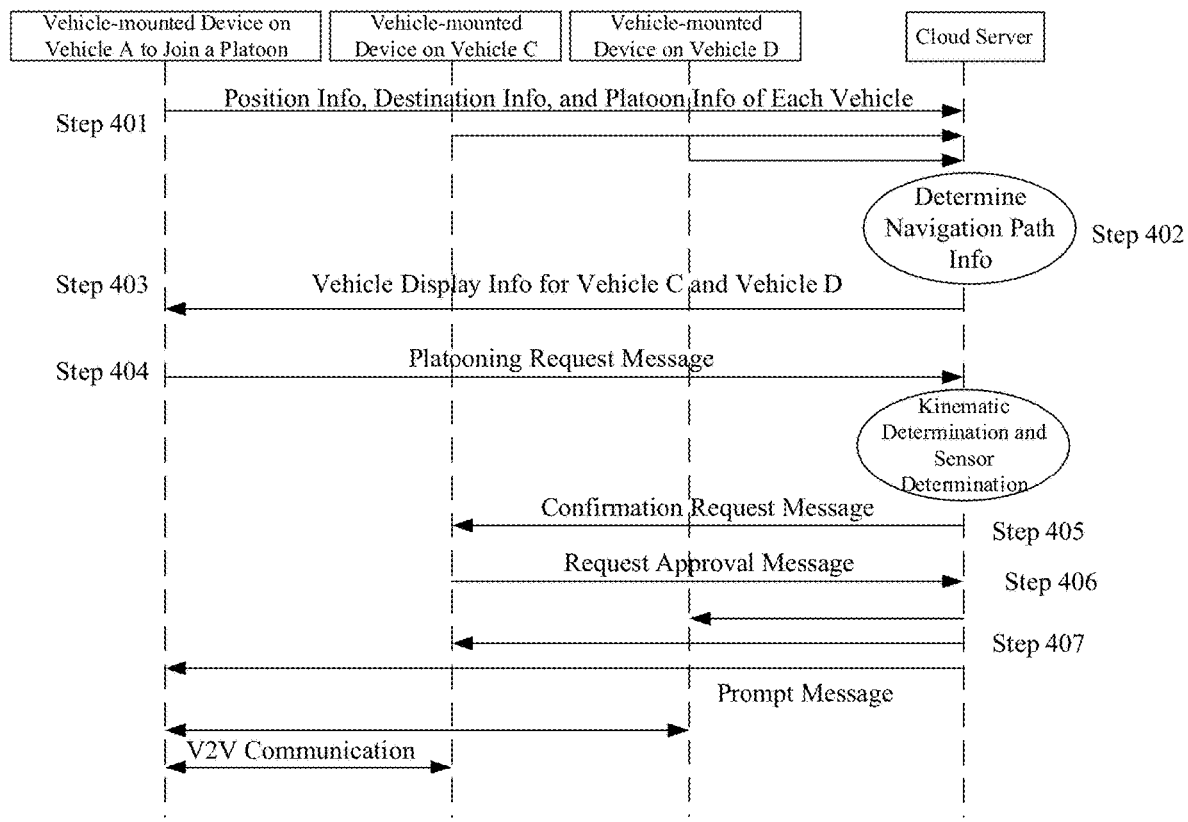
FIG. 6 is a schematic diagram showing a process of interaction between vehicle-mounted devices and a cloud server according to an embodiment of the present disclosure.

The embodiment of the present disclosure will be described by describing a process of interaction between a vehicle-mounted device on Vehicle A to join the platoon, a vehicle-mounted device on Vehicle C, a vehicle-mounted device on Vehicle D, and a cloud server, as shown in FIG. 6.

First, it is assumed that Vehicle A to join the platoon, Vehicle C, and Vehicle D have been registered as vehicles allowed for platooning. For details of the specific vehicle registration process, reference can be made to the above step 201 to step 202.

Then, the process of interaction between the vehicle-mounted device on Vehicle A to join the platoon, the vehicle-mounted device on Vehicle C, the vehicle-mounted device on Vehicle D, and the cloud server includes the following steps, as shown in FIG. 6.

At step 401, the vehicle-mounted device on Vehicle A to join the platoon, the vehicle-mounted device on Vehicle C, and the vehicle-mounted device on Vehicle D upload their respective position information, destination information, and platoon information to the cloud server in real time.

At step 402, the cloud server determines navigation path information for Vehicle A to join the platoon, Vehicle C, and Vehicle D based on the position information and destination information uploaded in real time.

At step 403, the cloud server transmits vehicle display information within a predetermined distance from the vehicle to join the platoon to the vehicle-mounted device on Vehicle A to join the platoon based on the position information, destination information, platoon information, and navigation path information, such that the vehicle-mounted device on Vehicle A to join the platoon can display the vehicle display information. Here, only the vehicle display information of Vehicle C and Vehicle D is transmitted as an example.

At step 404, the vehicle-mounted device on Vehicle A to join the platoon generates a platooning request message by selecting based on the vehicle display information and transmits it to the cloud server.

Next, the cloud server will perform the above determination process from step 206 to step 213. That is, the cloud server determines whether Vehicle A to join the platoon is suitable for joining Platoon B, i.e., based on a kinematic determination result and a sensor determination result for Vehicle A to join the platoon, Vehicle C, and Vehicle D. Details of the determination process will be omitted here.

At step 405, when the kinematic determination result and the sensor determination result are both successful, the cloud server transmits a confirmation request message to a lead vehicle of Platoon B which Vehicle A is to join, i.e., to the vehicle-mounted device on Vehicle C in this example.

At step 406, the vehicle-mounted device on Vehicle C transmits a request approval message to the cloud server, indicating that it approves the request from Vehicle A to join the platoon.

At step 407, the cloud server transmits a prompt message to the vehicle-mounted device on Vehicle A, the vehicle-mounted device on Vehicle C, and the vehicle-mounted device on Vehicle D, and controls the vehicle-mounted device on Vehicle A to establish a V2V communication connection with the vehicle-mounted devices on Vehicle C and Vehicle D, such that Vehicle A joins the platoon at the tail of the platoon, i.e., behind Vehicle D, thereby causing Vehicle A to finish joining the platoon.

The embodiments of the present disclosure provide a method, an apparatus, and a system for platooning. With a cloud server and vehicle-mounted devices on a number of vehicles, a platooning request message transmitted by a vehicle-mounted device on a vehicle to join a platoon is received. Based on the platooning request message, a first vehicle type and first kinematic information of the vehicle to join the platoon, a second vehicle type and second kinematic information of a vehicle currently at a tail of the platoon, first sensor operating status information of the vehicle to join the platoon, and second sensor operating status information of each vehicle in the platoon are obtained. Vehicle kinematic determination is performed based on the first vehicle type, the first kinematic information, the second vehicle type, and the second kinematic information, to obtain a kinematic determination result. Sensor determination is performed based on the first sensor operating status information and the second sensor operating status information, to obtain a sensor determination result. A confirmation request message is transmitted to a vehicle-mounted device on a lead vehicle of the platoon when the kinematic determination result and the sensor determination result are both successful. Upon receiving a request approval message from the vehicle-mounted device on the lead vehicle of the platoon, the vehicle-mounted device on the vehicle to join the platoon is controlled to establish a V2V communication connection with a vehicle-mounted device on each vehicle in the platoon, such that the vehicle to join the platoon joins the platoon at the tail of the platoon. The embodiments of the present disclosure do not rely on processing and responding by any RSU, and can achieve platooning in an area without RSUs. Moreover, the embodiments of the present disclosure authenticate whether a vehicle meets a requirement for joining a platoon based on vehicle kinematics and sensors, so as to avoid the problem associated with the lack of an authentication process for the vehicle to join a platoon, which would otherwise result in a security risk while the platoon is moving.

The basic principles of the present disclosure have been described above with reference to the embodiments. However, it can be appreciated by those skilled in the art that all or any of the steps or components of the method or device according to the present disclosure can be implemented in hardware, firmware, software, or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer-readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such an integrated module can be implemented in hardware or software functional units. When implemented in software functional units and sold or used as a standalone product, the integrated module can be stored in a computer-readable storage medium.

It can be appreciated by those skilled in the art that the embodiments of the present disclosure can be implemented as a method, a system, or a computer program product. The present disclosure may include pure hardware embodiments, pure software embodiments, and any combination thereof. Also, the present disclosure may include a computer program product implemented on one or more computer-readable storage mediums (including, but not limited to, magnetic disk storage and optical storage) containing computer-readable program codes.

The present disclosure has been described with reference to the flowcharts and/or block diagrams of the method, device (system), and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor, or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer-readable memory that can direct a computer or any other programmable data processing device to operate in a particular way. Thus, the instructions stored in the computer-readable memory constitute manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have been described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for platooning, comprising:
   receiving, from a first vehicle, a platooning request message for joining a platoon;
   obtaining, based on the platooning request message, a first vehicle type, first kinematic information and first sensor operating status information of the first vehicle, a second vehicle type, second kinematic information and second sensor operating status information of a second vehicle currently at a tail of the platoon, comprising:
      transmitting a sensor operating status request message to the first vehicle and the second vehicle currently at the tail respectively;
      receiving the first sensor operating status information from the first vehicle and the second sensor operating status information from the second vehicle currently at the tail, the first sensor operating status information and the second sensor operating status information each comprising an operating status of a minimum perception information sensor, operating status and accuracy of a positioning sensor, and operating status and accuracy of a forward distance sensor;
   performing vehicle kinematic determination based on the first vehicle type, the first kinematic information, the second vehicle type, and the second kinematic information, to obtain a kinematic determination result;

performing sensor determination based on the first sensor operating status information and the second sensor operating status information, to obtain a sensor determination result;

transmitting a confirmation request message to a third vehicle in response to the kinematic determination result and the sensor determination result meeting a first predetermined condition, wherein the third vehicle is in the platoon; and controlling, upon receiving a request approval message from the third vehicle, the first vehicle to establish a Vehicle-to-Vehicle (V2V) communication connection with each vehicle in the platoon.

2. The method of claim 1, further comprising:

receiving, from a fourth vehicle, a vehicle registration message for joining the platoon, the vehicle registration message containing a vehicle license plate number, a third vehicle type, a vehicle electronic tag, vehicle driver information, vehicle power system information, and vehicle sensor information; and allowing the fourth vehicle to join the platoon in response to the vehicle registration message meeting a second predetermined condition.

3. The method of claim 2, further comprising:

receiving position information, destination information, and platoon information from the fourth vehicle;

determining navigation path information for the fourth vehicle based on the position information and the destination information.

4. The method of claim 3, further comprising:

transmitting, to the first vehicle, vehicle display information for the fourth vehicle, the vehicle display information containing the vehicle license plate number, the third vehicle type, the position information, the destination information, and the platoon information of the fourth vehicle and a distance for the fourth vehicle to move together with the first vehicle.

5. The method of claim 4, wherein the vehicle display information comprises a plurality of pieces of vehicle display information, and the platooning request message comprises a selected one of the plurality of pieces of vehicle display information, and receiving, from the first vehicle, the platooning request message comprises:

in response to the platoon information in the selected piece of vehicle display information being empty, determining that the second vehicle currently at the tail of the platoon corresponds to the selected piece of vehicle display information; and in response to the platoon information in the selected piece of vehicle display information being not empty, determining the platoon based on the platoon information.

6. The method of claim 1, wherein the platooning request message further comprises a vehicle electronic tag of the first vehicle, wherein obtaining, based on the platooning request message, the first vehicle type, the first kinematic information and the first sensor operating status information of the first vehicle, the second vehicle type, the second kinematic information and the second sensor operating status information of the second vehicle currently at the tail of the platoon further comprises:

retrieving a vehicle registration message of the first vehicle based on the vehicle electronic tag of the first vehicle, to obtain the first vehicle type and the first kinematic information of the first vehicle, the first kinematic information comprising a minimum turning radius and a braking preparation time length of the first vehicle;

obtaining a vehicle electronic tag of the second vehicle currently at the tail;

retrieving a vehicle registration message of the second vehicle currently at the tail, to obtain the second vehicle type and the second kinematic information of the second vehicle currently at the tail, the second kinematic information comprising a minimum turning radius and a braking preparation time length of the second vehicle currently at the tail.

7. The method of claim 6, wherein performing the vehicle kinematic determination based on the first vehicle type, the first kinematic information, the second vehicle type, and the second kinematic information, to obtain the kinematic determination result comprises:

obtaining a first vehicle level to which the first vehicle type corresponds and a second vehicle level to which the second vehicle type corresponds based on the first vehicle type and the second vehicle type, respectively, wherein the first vehicle level is associated with a first vehicle volume and a first vehicle weight, the second vehicle level is associated with a second vehicle volume and a second vehicle weight;

determining whether the first vehicle level is lower than or equal to the second vehicle level;

comparing the minimum turning radius of the first vehicle with the minimum turning radius of the second vehicle currently at the tail;

comparing the braking preparation time length of the first vehicle with the braking preparation time length of the second vehicle currently at the tail; and determining the kinematic determination result meets the first predetermined condition in response to the first vehicle level being lower than or equal to the second vehicle level, the minimum turning radius of the first vehicle being smaller than or equal to the minimum turning radius of the second vehicle currently at the tail, and the braking preparation time length of the first vehicle being smaller than or equal to the braking preparation time length of the second vehicle currently at the tail.

8. The method of claim 6, wherein performing sensor determination based on the first sensor operating status information and the second sensor operating status information, to obtain the sensor determination result comprises:

determining whether the operating status of the minimum perception information sensor on the first vehicle and the operating status of the minimum perception information sensor on the second vehicle currently at the tail are operating normally or operating with redundancy, whether the operating status and accuracy of the positioning sensor on the first vehicle and the operating status and accuracy of the positioning sensor on the second vehicle currently at the tail are normal, and whether the operating status and accuracy of the forward distance sensor on the first vehicle and the operating status and accuracy of the forward distance sensor on the second vehicle currently at the tail are normal; and determining the sensor determination result meets the first predetermined condition in response to the operating status of the minimum perception information sensor on the first vehicle and the operating status of the minimum perception information sensor on the second vehicle currently at the tail being operating normally or operating with redundancy, the operating status and accuracy of the positioning sensor on the first vehicle and the operating status and accuracy of the positioning sensor on the second vehicle currently at the tail being normal, and the operating status and accuracy of the forward distance sensor on the first vehicle and the operating status and accuracy of the forward distance sensor on the second vehicle currently at the tail being normal.

9. A method for platooning, comprising:
receiving, from a first vehicle, a platooning request message for joining a platoon;
obtaining, based on the platooning request message, a first vehicle type, first kinematic information and first sensor operating status information of the first vehicle, and a second vehicle type, second kinematic information and second sensor operating status information of a second vehicle currently at a tail of the platoon, comprising:
 transmitting a sensor operating status request message to the first vehicle and the second vehicle currently at the tail;
 receiving the first sensor operating status information from the first vehicle and the second sensor operating status information from the second vehicle currently at the tail, the first sensor operating status information and the second sensor operating status information each comprising an operating status of a minimum perception information sensor, operating status and accuracy of a positioning sensor, and operating status and accuracy of a forward distance sensor;
performing vehicle kinematic determination, based on the first vehicle type, the first kinematic information, the second vehicle type, and the second kinematic information, to obtain a kinematic determination result;
performing sensor determination, based on the first sensor operating status information and the second sensor operating status information, to obtain a sensor determination result; and
establishing a Vehicle-to-Vehicle (V2V) communication connection with the first vehicle in response to the kinematic determination result and the sensor determination result meeting a first predetermined condition.

10. The method of claim 9, wherein the platooning request message comprises a vehicle electronic tag of the first vehicle,
wherein obtaining, based on the platooning request message, the first vehicle type, the first kinematic information and the first sensor operating status information of the first vehicle, and the second vehicle type, the second kinematic information and the second sensor operating status information of the second vehicle currently at the tail of the platoon, further comprises:
retrieving a vehicle registration message of the first vehicle based on the vehicle electronic tag of the first vehicle, to obtain the first vehicle type and the first kinematic information of the first vehicle, the first kinematic information comprising a minimum turning radius and a braking preparation time length of the first vehicle;
obtaining a vehicle electronic tag of the second vehicle currently at the tail;
retrieving a vehicle registration message of the second vehicle currently at the tail based on the vehicle electronic tag of the second vehicle currently at the tail, to obtain the second vehicle type and the second kinematic information of the second vehicle currently at the tail, the second kinematic information comprising a minimum turning radius and a braking preparation time length of the second vehicle currently at the tail.

11. The method of claim 10, wherein performing the vehicle kinematic determination, based on the first vehicle type, the first kinematic information, the second vehicle type, and the second kinematic information, to obtain the kinematic determination result comprises:
obtaining a first vehicle level to which the first vehicle type corresponds and a second vehicle level to which the second vehicle type corresponds based on the first vehicle type and the second vehicle type, respectively, wherein the first vehicle level is associated with a first vehicle volume and a first vehicle weight, the second vehicle level is associated with a second vehicle volume and a second vehicle weight;
determining whether the first vehicle level is lower than or equal to the second vehicle level;
comparing the minimum turning radius of the first vehicle with the minimum turning radius of the second vehicle currently at the tail;
comparing the braking preparation time length of the first vehicle with the braking preparation time length of the second vehicle currently at the tail; and
determining the kinematic determination result meets the first predetermined condition in response to the first vehicle level being lower than or equal to the second vehicle level, the minimum turning radius of the first vehicle being smaller than or equal to the minimum turning radius of the second vehicle currently at the tail, and the braking preparation time length of the first vehicle being smaller than or equal to the braking preparation time length of the second vehicle currently at the tail.

12. The method of claim 10, wherein performing sensor determination, based on the first sensor operating status information and the second sensor operating status information, to obtain the sensor determination result comprises:
determining whether the operating status of the minimum perception information sensor on the first vehicle and the operating status of the minimum perception information sensor on the second vehicle currently at the tail are operating normally or operating with redundancy, whether the operating status and accuracy of the positioning sensor on the first vehicle and the operating status and accuracy of the positioning sensor on the second vehicle currently at the tail are normal, and whether the operating status and accuracy of the forward distance sensor on the first vehicle and the operating status and accuracy of the forward distance sensor on the second vehicle currently at the tail are normal; and
determining the sensor determination result meets the first predetermined condition in response to the operating status of the minimum perception information sensor on the first vehicle and the operating status of the minimum perception information sensor on the second vehicle currently at the tail being operating normally or operating with redundancy, the operating status and accuracy of the positioning sensor on the first vehicle and the operating status and accuracy of the positioning sensor on the second vehicle currently at the tail being normal, and the operating status and accuracy of the forward distance sensor on the first vehicle and the operating status and accuracy of the forward distance sensor on the second vehicle currently at the tail being normal.

13. A computing apparatus, comprising:
a processor; and
a memory storing program codes that, when executed by the processor, causes the apparatus to implement a method comprising:
receiving, from a first vehicle, a platooning request message for joining a platoon;
obtaining, based on the platooning request message, a first vehicle type, first kinematic information and first sensor operating status information of the first vehicle, a second vehicle type, second kinematic information and second sensor operating status information of a second vehicle currently at a tail of the platoon, comprising:
transmitting a sensor operating status request message to the first vehicle and the second vehicle currently at the tail respectively;
receiving the first sensor operating status information from the first vehicle and the second sensor operating status information from the second vehicle currently at the tail, the first sensor operating status information and the second sensor operating status information each comprising an operating status of a minimum perception information sensor, operating status and accuracy of a positioning sensor, and operating status and accuracy of a forward distance sensor;
performing vehicle kinematic determination based on the first vehicle type, the first kinematic information, the second vehicle type, and the second kinematic information, to obtain a kinematic determination result;
performing sensor determination based on the first sensor operating status information and the second sensor operating status information, to obtain a sensor determination result;
transmitting a confirmation request message to a third vehicle in response to the kinematic determination result and the sensor determination result meeting a first predetermined condition, wherein the third vehicle is in the platoon; and
controlling, upon receiving a request approval message from the third vehicle, the first vehicle to establish a Vehicle-to-Vehicle (V2V) communication connection with each vehicle in the platoon.

14. The computing apparatus of claim 13, wherein the program codes, when executed by the processor, causes the apparatus to implement the method further comprising:
receiving, from a fourth vehicle, a vehicle registration message for joining the platoon, the vehicle registration message containing a vehicle license plate number, a third vehicle type, a vehicle electronic tag, vehicle driver information, vehicle power system information, and vehicle sensor information; and
allowing the fourth vehicle to join the platoon in response to the vehicle registration message meeting a second predetermined condition.

15. The computing apparatus of claim 14, wherein the program codes, when executed by the processor, causes the apparatus to implement the method further comprising:
receiving position information, destination information, and platoon information from the fourth vehicle;
determining navigation path information for the fourth vehicle based on the position information and the destination information.

16. The computing apparatus of claim 15, wherein the program codes, when executed by the processor, causes the apparatus to implement the method further comprising:
transmitting, to the first vehicle, vehicle display information for the fourth vehicle, the vehicle display information containing the vehicle license plate number, the third vehicle type, the position information, the destination information, and the platoon information of the fourth vehicle and a distance for the fourth vehicle to move together with the first vehicle.

17. The computing apparatus of claim 16, wherein the vehicle display information comprises a plurality of pieces of vehicle display information, and the platooning request message comprises a selected one of the plurality of pieces of vehicle display information, and receiving, from the first vehicle, the platooning request message comprises:
in response to the platoon information in the selected piece of vehicle display information being empty, determining that the second vehicle currently at the tail of the platoon corresponds to the selected piece of vehicle display information; and
in response to the platoon information in the selected piece of vehicle display information being not empty, determining the platoon based on the platoon information.

18. The computing apparatus of claim 13, wherein the platooning request message further comprises a vehicle electronic tag of the first vehicle,
wherein obtaining, based on the platooning request message, the first vehicle type, the first kinematic information and the first sensor operating status information of the first vehicle, the second vehicle type, the second kinematic information and the second sensor operating status information of the second vehicle currently at the tail of the platoon further comprises:
retrieving a vehicle registration message of the first vehicle based on the vehicle electronic tag of the first vehicle, to obtain the first vehicle type and the first kinematic information of the first vehicle, the first kinematic information comprising a minimum turning radius and a braking preparation time length of the first vehicle;
obtaining a vehicle electronic tag of the second vehicle currently at the tail;
retrieving a vehicle registration message of the second vehicle currently at the tail, to obtain the second vehicle type and the second kinematic information of the second vehicle currently at the tail, the second kinematic information comprising a minimum turning radius and a braking preparation time length of the second vehicle currently at the tail.

19. The computing apparatus of claim 18, wherein performing the vehicle kinematic determination based on the first vehicle type, the first kinematic information, the second vehicle type, and the second kinematic information, to obtain the kinematic determination result comprises:
obtaining a first vehicle level to which the first vehicle type corresponds and a second vehicle level to which the second vehicle type corresponds based on the first vehicle type and the second vehicle type, respectively, wherein the first vehicle level is associated with a first vehicle volume and a first vehicle weight, the second vehicle level is associated with a second vehicle volume and a second vehicle weight;
determining whether the first vehicle level is lower than or equal to the second vehicle level;
comparing the minimum turning radius of the first vehicle with the minimum turning radius of the second vehicle currently at the tail;
comparing the braking preparation time length of the first vehicle with the braking preparation time length of the second vehicle currently at the tail; and determining the kinematic determination result meets the first predetermined condition in response to the first vehicle level being lower than or equal to the second vehicle level, the minimum turning radius of the first vehicle being smaller than or equal to the minimum turning radius of the second vehicle currently at the tail, and the braking preparation time length of the first vehicle being smaller than or equal to the braking preparation time length of the second vehicle currently at the tail.

20. The computing apparatus of claim 18, wherein performing sensor determination based on the first sensor operating status information and the second sensor operating status information, to obtain the sensor determination result comprises:

determining whether the operating status of the minimum perception information sensor on the first vehicle and the operating status of the minimum perception information sensor on the second vehicle currently at the tail are operating normally or operating with redundancy, whether the operating status and accuracy of the positioning sensor on the first vehicle and the operating status and accuracy of the positioning sensor on the second vehicle currently at the tail are normal, and whether the operating status and accuracy of the forward distance sensor on the first vehicle and the operating status and accuracy of the forward distance sensor on the second vehicle currently at the tail are normal; and determining the sensor determination result meets the first predetermined condition in response to the operating status of the minimum perception information sensor on the first vehicle and the operating status of the minimum perception information sensor on the second vehicle currently at the tail being operating normally or operating with redundancy, the operating status and accuracy of the positioning sensor on the first vehicle and the operating status and accuracy of the positioning sensor on the second vehicle currently at the tail being normal, and the operating status and accuracy of the forward distance sensor on the first vehicle and the operating status and accuracy of the forward distance sensor on the second vehicle currently at the tail being normal.

\* \* \* \* \*